(12) United States Patent
Kono et al.

(10) Patent No.: US 11,274,670 B2
(45) Date of Patent: Mar. 15, 2022

(54) BLOWER

(71) Applicant: DENSO CORPORATION, Kariya (JP)

(72) Inventors: Tetsuya Kono, Kariya (JP); Ryo Kobayashi, Kariya (JP); Yasue Yonezu, Kariya (JP); Takahiro Nakajima, Kariya (JP); Yuki Tsumagari, Kariya (JP); Tomohide Shindo, Kariya (JP)

(73) Assignee: DENSO CORPORATION, Kariya (JP)

( * ) Notice: Subject to any disclaimer, the term of this patent is extended or adjusted under 35 U.S.C. 154(b) by 107 days.

(21) Appl. No.: 16/783,735

(22) Filed: Feb. 6, 2020

(65) Prior Publication Data
US 2020/0173445 A1     Jun. 4, 2020

Related U.S. Application Data

(63) Continuation of application No. PCT/JP2018/026368, filed on Jul. 12, 2018.

(30) Foreign Application Priority Data

Aug. 11, 2017   (JP) .............................. JP2017-156251

(51) Int. Cl.
*B60H 1/32* (2006.01)
*F04D 17/10* (2006.01)
(Continued)

(52) U.S. Cl.
CPC ......... *F04D 17/10* (2013.01); *B60H 1/00021* (2013.01); *F04D 29/4213* (2013.01); *B60H 2001/00092* (2013.01); *F05B 2240/12* (2013.01)

(58) Field of Classification Search
CPC ............ B60H 1/00842; B60H 1/00849; B60H 1/00064; B60H 2001/00135;
(Continued)

(56) References Cited

U.S. PATENT DOCUMENTS

| 4,252,181 A | * | 2/1981 | Kirchmeier | ........... F28D 19/045 165/7 |
| 7,614,250 B2 | * | 11/2009 | Sanagi | .................. F24F 1/0063 62/426 |

(Continued)

FOREIGN PATENT DOCUMENTS

| JP | 2004132342 A | 4/2004 |
| JP | 2016011101 A | 1/2016 |

(Continued)

*Primary Examiner* — Justin D Seabe
(74) *Attorney, Agent, or Firm* — Harness, Dickey & Pierce, P.L.C.

(57) ABSTRACT

A blower includes a centrifugal fan and a partition wall disposed in a suction space in the centrifugal fan. The partition wall has a base portion extending along a fan central axis to partition the suction space into a first space for a first fluid and a second space for a second fluid. The partition wall has an enlarged portion connected to an end of the base portion on another side of the fan central axis. The enlarged portion covers a part of a fan boss. A clearance passage is defined between the enlarged portion and the fan boss and has a first space side opening and a second space side opening. The enlarged portion is biased in the suction space to the second space such that a pressure at the second space side opening is less than a pressure at the first space side opening.

5 Claims, 15 Drawing Sheets

(51) Int. Cl.
*F04D 29/42* (2006.01)
*B60H 1/00* (2006.01)

(58) Field of Classification Search
CPC  B60H 2001/00721; B60H 2001/00192; F04D 29/28; F04D 29/281; F04D 29/282; F24F 1/0022
See application file for complete search history.

(56) References Cited

U.S. PATENT DOCUMENTS

| | | | |
|---|---|---|---|
| 10,369,862 B2 * | 8/2019 | Yamaoka | B60H 1/00564 |
| 2011/0023526 A1 * | 2/2011 | Ohyama | F04D 29/281 62/426 |
| 2016/0288609 A1 | 10/2016 | Yamaoka et al. | |
| 2019/0017515 A1 | 1/2019 | Sekito et al. | |

FOREIGN PATENT DOCUMENTS

| | | |
|---|---|---|
| JP | 2018001911 A | 1/2018 |
| WO | WO-2015075912 A1 | 5/2015 |
| WO | WO-2017119475 A1 | 7/2017 |

\* cited by examiner

BLOWER

CROSS REFERENCE TO RELATED APPLICATION

The present application is a continuation application of International Patent Application No. PCT/JP2018/026368 filed on Jul. 12, 2018, which designated the U.S. and claims the benefit of priority from Japanese Patent Application No. 2017-156251 filed on Aug. 11, 2017. The entire disclosures of all of the above applications are incorporated herein by reference.

TECHNICAL FIELD

The present disclosure relates to a blower.

BACKGROUND

In general blowers that draw and blow a first fluid and a second fluid, some blowers have a partition wall for the purpose of separating the first fluid and the second fluid. Further, some of vehicular air-conditioning devices are configured to perform an inside-outside air mode in which the outside air introduced from the outside of the passenger compartment is blown toward an inside of a windshield of the vehicle and the inside air introduced from the inside of the passenger compartment circulates in the passenger compartment.

SUMMARY

The present disclosure relates to a blower configured to blow a first fluid and a second fluid. The blower of the present disclosure includes: a centrifugal fan configured to rotate about a fan central axis so as to draw the first fluid and the second fluid from one side of the fan central axis and blow the first fluid and the second fluid outward in a direction away from the fan central axis; and a partition wall that is disposed in a suction space defined on an air suction side of the centrifugal fan, the partition wall being spaced from the centrifugal fan.

The centrifugal fan includes: blades arranged around the suction space and spaced from each other, the blades being configured to draw an air from the one side of the fan central axis by rotating about the fan central axis; and a fan boss that connects an end of each of the blades on another side of the fan central axis with each other.

The partition wall has: a base portion that extends along the fan central axis in the suction space so as to partition the suction space at least into a first space through which the first fluid flows and a second space through which the second fluid flows; and an enlarged portion connected to an end of the base portion on the other side of the fan central axis, the enlarged portion extending in a direction from the fan central axis toward the blades so as to cover a part of the fan boss.

According to findings of the inventors, in the suction space of the centrifugal fan, a pressure in a space close to the blades of the centrifugal fan tends to be lower than a pressure in a space close to the fan central axis.

In view of this tendency, in the blower according to a first aspect of the present disclosure, a clearance passage is defined between the enlarged portion and the fan boss. A first space side opening that opens in the first space and a second space side opening that opens in the second space communicate through the clearance passage. The partition wall is biased to the second space such that a pressure at the second space side opening is lower than a pressure at the first space side opening.

According to another aspect of the present disclosure, the enlarged portion of the blower has an extended portion whose length from the fan central axis to an outer edge portion facing leading edges of the blades is longer than a predetermined reference length. The extended portion of the enlarged portion is biased in the suction space to the second space.

EMBODIMENTS

Figure 1:
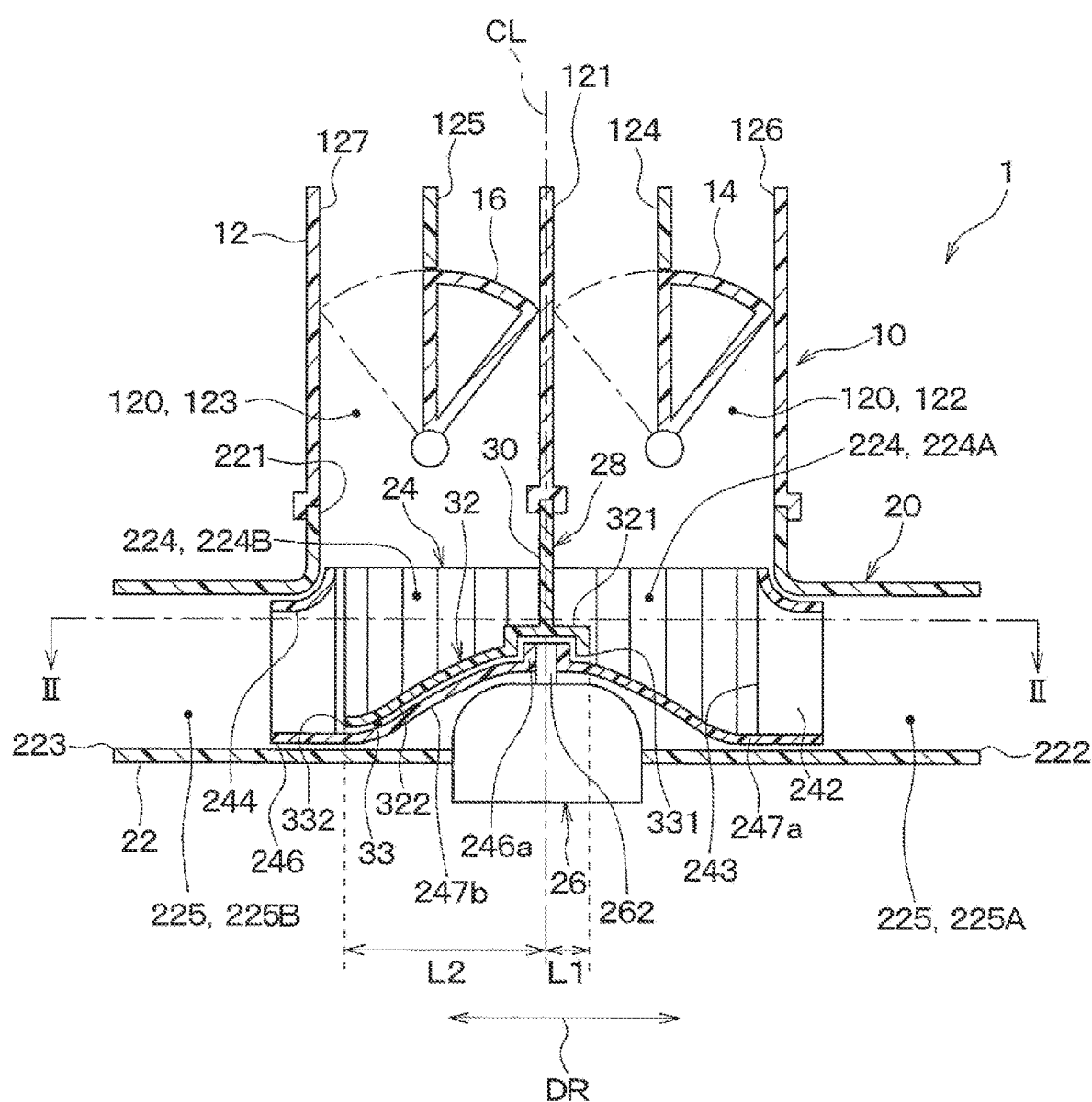
FIG. 1 is a cross-sectional diagram taken along an axial direction, schematically showing a blower unit including a blower according to at least one embodiment.

Embodiments of the present disclosure will be described below with reference to the drawings. In the following embodiments, portions that are the same as or equivalent to those described in the preceding embodiments are denoted by the same reference numerals, and a description of the same or equivalent portions may be omitted. In addition, when only a part of the components is described in the embodiment, the components described in the preceding embodiment can be applied to other parts of the components. In the following embodiments, the embodiments can be partially combined with each other as long as the embodiments do not cause any trouble in combination, even if the combination is not specified in particular.

First Embodiment

The present embodiment will be described with reference to FIGS. 1 to 7. In the present embodiment, a blower 20 of the present disclosure is used in a blower unit 1 of a vehicular air-conditioning device mounted on a vehicle. The vehicular air-conditioning device is disposed inside an instrument panel at the front area in the passenger compartment. The vehicular air-conditioning device is an inside-outside air type air-conditioning device configured to (i) draw an outside air from an outside of the passenger compartment and an inside air from an inside of the passenger compartment and (ii) separately blow the outside air and inside air into the passenger compartment. The vehicular air-conditioning device of the present embodiment is configured to perform an inside-outside air mode in which the outside air as a first fluid is blown toward an inside of a windshield of the vehicle and the inside air as a second fluid circulates in the passenger compartment.

The vehicular air-conditioning device includes the blower unit 1 configured to blow air introduced from the inside or the outside of the passenger compartment into the passenger compartment, and a temperature adjustment unit configured to adjust a temperature of the air to be blown into the passenger compartment. The temperature adjustment unit (not shown) includes a cooling heat exchanger for cooling the air and a heating heat exchanger for heating the air. The cooling heat exchanger may be an evaporator of a vapor compression refrigeration cycle, for example. The heating heat exchanger may be a heater core configured to release heat of an engine cooling water, for example.

The temperature adjustment unit includes a defroster outlet through which the air is blown toward the inside of the windshield of the vehicle, a face outlet through which the air is blown toward an upper body of an occupant in the passenger compartment, and a foot outlet through which the air is blown toward a lower body of the occupant in the passenger compartment.

The blower unit 1 of the present embodiment is connected to an air flow upstream side of the temperature adjustment unit. The air introduced from the outside or the inside of the passenger compartment flows into the temperature adjustment unit through the blower unit 1.

As shown in FIG. 1, the blower unit 1 includes an inside-outside air introduction portion 10 through which the inside air and the outside air are introduced therein, and a blower 20 located downstream of the inside-outside air introduction portion 10. The inside-outside air introduction portion 10 includes an inside-outside air casing 12 forming an outer shell. The inside-outside air casing 12 defines therein an air introduction passage 120 through which the air is introduced. A suction partition panel 121 is disposed in the air introduction passage 120. The suction partition panel 121 partitions the air introduction passage 120 into a first introduction passage 122 and a second introduction passage 123. Since the first introduction passage 122 and the second introduction passage 123 are partitioned by the suction partition panel 121, airs having different temperature, humidity and the like can flow without being mixed.

The first introduction passage 122 has an outside air introduction port 124 and an inside air introduction port 126 at the most upstream end. The second introduction passage 123 has an outside air introduction port 125 and an inside air introduction port 127 at the most upstream end. The outside air introduction port 124 is an opening through which the outside air flows into the first introduction passage 122. The outside air introduction port 125 is an opening through which the outside air flows into the second introduction passage 123. The inside air introduction port 126 is an opening through which the inside air flows into the first introduction passage 122. The inside air introduction port 127 is an opening through which the inside air flows into the second introduction passage 123.

A first inside-outside air switching door 14 is disposed in the first introduction passage 122. The first inside-outside air switching door 14 is configured to change proportions of the amount of the inside air and the amount of the outside air introduced into the first introduction passage 122 by adjusting opening areas of the outside air introduction port 124 and the inside air introduction port 126.

A second inside-outside air switching door 16 is disposed in the second introduction passage 123. The second inside-outside air switching door 16 is configured to change proportions of the amount of the inside air and the amount of the outside air introduced into the second introduction passage 123 by adjusting opening areas of the outside air introduction port 125 and the inside air introduction port 127.

For example, in the inside-outside air mode in which the outside air is introduced into the first introduction passage 122 and the inside air is introduced into the second introduction passage 123, the first inside-outside air switching door 14 is controlled such that the outside air introduction port 124 opens and the inside air introduction port 126 is closed, as shown in FIG. 1. At this time, the second inside-outside air switching door 16 is controlled such that the inside air introduction port 127 opens and the outside air introduction port 125 is closed.

In an outside air mode (not shown) in which the outside air is introduced into both the first introduction passage 122 and the second introduction passage 123, the first inside-outside air switching door 14 is controlled such that the outside air introduction port 124 opens and the inside air introduction port 126 is closed, and the second inside-outside air switching door 16 is controlled such that the outside air introduction port 125 opens and the inside air introduction port 127 is closed.

In an inside air mode (not shown) in which the inside air is introduced into both the first introduction passage 122 and the second introduction passage 123, the first inside-outside air switching door 14 is controlled such that the inside air introduction port 126 opens and the outside air introduction port 124 is closed, and the second inside-outside air switching door 16 is controlled such that the inside air introduction port 127 opens and the outside air introduction port 125 is closed.

In the present embodiment, a rotary door is used as an example of the first inside-outside air switching door 14 and the second inside-outside air switching door 16. However, the first inside-outside air switching door 14 and the second inside-outside air switching door 16 are not limited to the rotary door. A plate door, a slide door or the like may be used as the first inside-outside air switching door 14 and the second inside-outside air switching door 16.

The blower 20 is located downstream of the inside-outside air introduction portion 10 in the airflow. The blower 20 is configured to blow the outside air as the first fluid and the inside air as the second fluid.

The blower 20 includes a blower casing 22 forming an outer shell, a centrifugal fan 24 housed in the blower casing 22, an electric motor 26 driving the centrifugal fan 24, and a partition wall 28.

The blower casing 22 has a suction port 221 through which the air introduced from the inside-outside air introduction portion 10 flows into the blower casing 22, and a pair of outlet ports 222, 223 through which the air blown by the centrifugal fan 24 flows into the temperature adjustment unit.

A suction space 224 is defined in the blower casing 22. The air flowing into an inside of the centrifugal fan 24 through the suction port 221 flows through the suction space 224. The suction space 224 is a circular column space whose center is a fan central axis CL of the centrifugal fan 24. The fan central axis CL is a rotation center line of the centrifugal fan 24.

The suction space 224 is partitioned by the partition wall 28 into a first space 224A through which the air flowing from the first introduction passage 122 (i.e. the first fluid) flows and a second space 224B through which the air flowing from the second introduction passage 123 (i.e. the second fluid) flows.

The blower casing 22 defines an outflow passage 225 that guides the air blown from the centrifugal fan 24 to the outlet ports 222, 223. The outflow passage 225 is defined outside the centrifugal fan 24 in a fan radial direction DR. The fan radial direction DR is perpendicular to a fan central axis CL.

Figure 2:
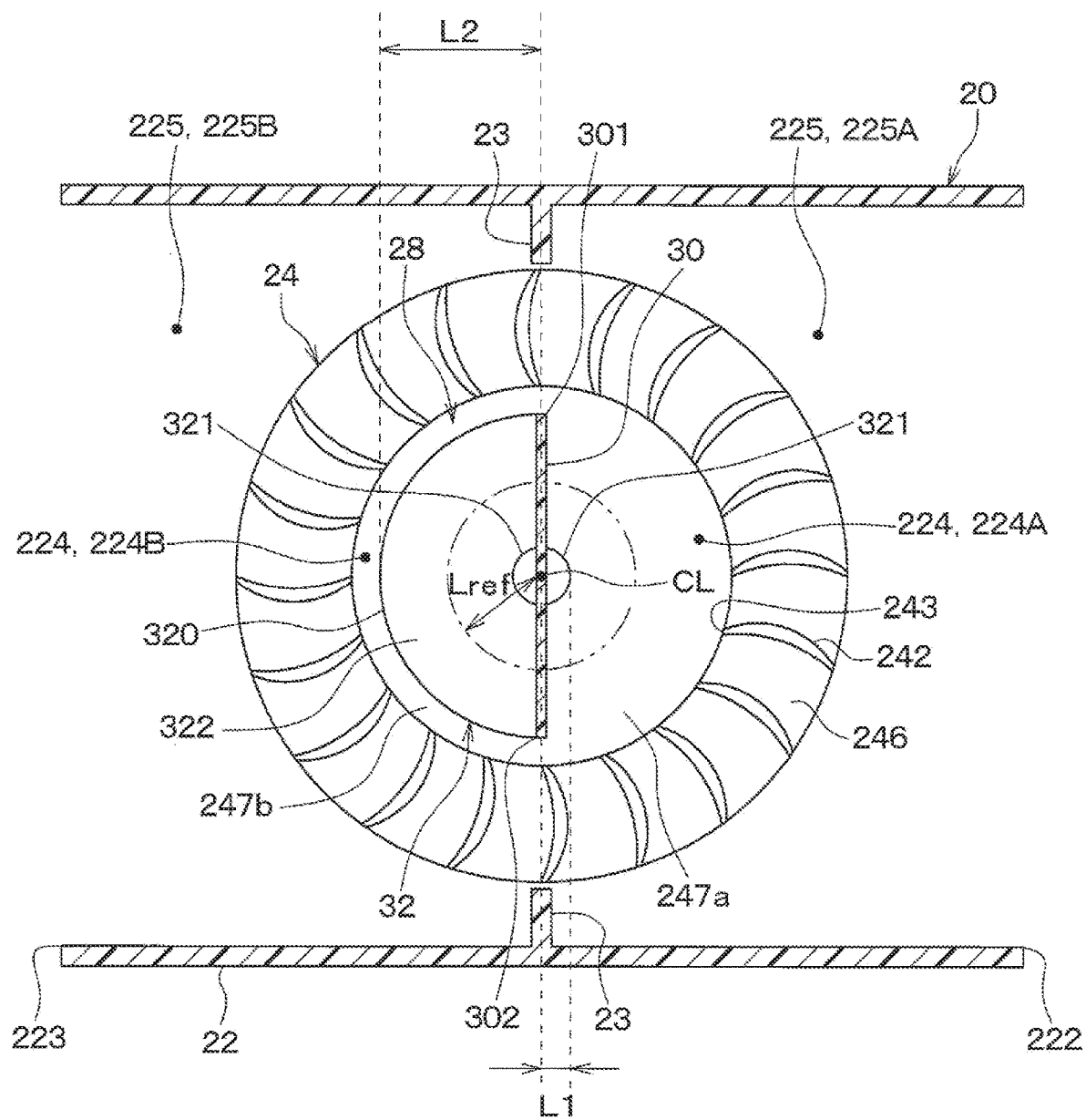
FIG. 2 is a cross-sectional view taken along line II-II in FIG. 1.
Figure 3:
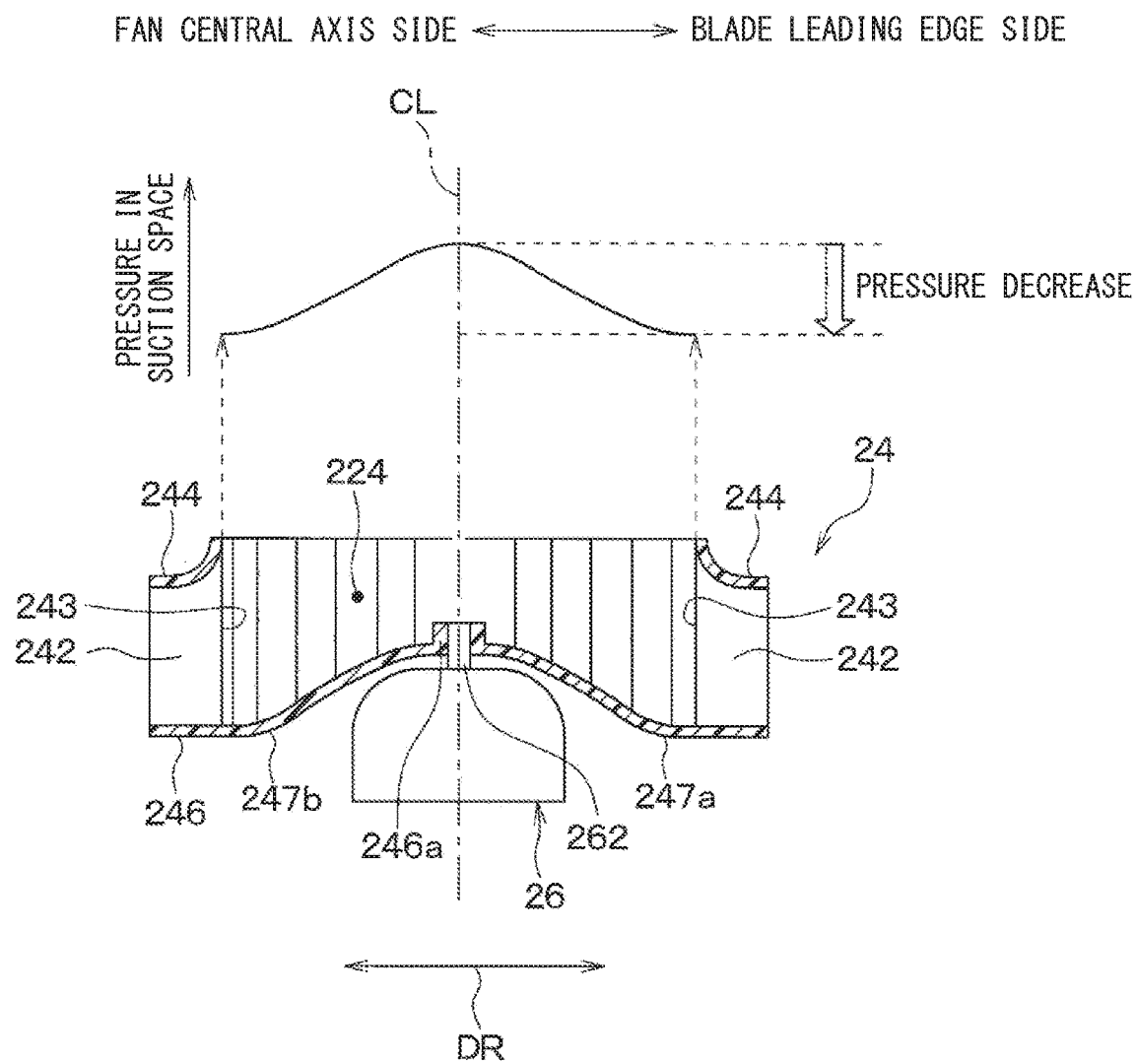
FIG. 3 is an explanatory diagram for explaining a pressure distribution in a suction space in a centrifugal fan.

As shown in FIG. 2, the outflow passage 225 of the present embodiment is partitioned by an outflow partition portion 23 of the blower casing 22 into a first outflow passage 225A through which the air flowing from the first introduction passage 122 flows and a second outflow passage 225B through which the air flowing from the second introduction passage 123 flows. The outflow partition portion 23 is a rib protruding from a side surface of the blower casing 22 toward the centrifugal fan 24.

The centrifugal fan 24 is housed in the blower casing 22. The centrifugal fan 24 is a fan configured to blow the air drawn from one side in the fan central axis CL outward in the fan radial direction DR by rotating about the fan central axis CL.

As shown in FIG. 1, the centrifugal fan 24 includes blades 242, a fan shroud 244, and a fan boss 246. In the centrifugal fan 24 of the present embodiment, the blades 242, the fan shroud 244, and the fan boss 246 are made of resin and integrated with each other to be a single component. The centrifugal fan 24 may be made of metal instead of resin.

The centrifugal fan 24 of the present embodiment is constituted by a turbo fan having a high static pressure in the respective types of the centrifugal fan 24. The centrifugal fan 24 may be constituted by a sirocco fan or a radial fan instead of a turbofan.

As shown in FIG. 2, the blades 242 are arranged at regular intervals in a circumferential direction around the suction space 224 having a circular column shape whose center is the fan central axis CL. Since the blades 242 of the centrifugal fan 24 rotate about the fan central axis CL, the air is drawn from one side of the fan central axis CL.

The fan shroud 244 has an annular shape. The fan shroud 244 is connected to one end of each blade 242 in the fan central axis CL. Each blade 242 is connected with each other through the fan shroud 244.

The fan boss 246 has a circular disk shape. The fan boss 246 is connected to the other end of each blade 242 in the fan central axis CL. An inner part of the fan boss 246 in the fan radial direction DR protrudes toward the one side of the fan central axis CL from an outer part of the fan boss 246. The fan boss 246 has an axial symmetric shape around the fan central axis CL. The fan boss 246 has a boss portion 246a at a center part for connecting the centrifugal fan 24 to an output shaft 262 of the electric motor 26.

The electric motor 26 is a motor configured to rotate the centrifugal fan 24. A part of the electric motor 26 is housed in the blower casing 22, and the remaining parts of the electric motor 26 are exposed to an outside of the blower casing 22. The output shaft 262 of the electric motor 26 is connected to the centrifugal fan 24. Since the rotation force of the electric motor 26 is transmitted to the centrifugal fan 24 through the output shaft 262, the centrifugal fan 24 rotates about the fan central axis CL.

The partition wall 28 is disposed in the suction space 224 defined on an air suction side of the centrifugal fan 24. The partition wall 28 is spaced from the centrifugal fan 24. The partition wall 28 is fixed by bonding, for example, to an inner wall of the blower casing 22 such that the partition wall 28 does not rotate.

The partition wall 28 has a base portion 30 that partitions the suction space 224 into the first space 224A through which the air flowing from the first introduction passage 122 flows and the second space 224B through which the air flowing from the second introduction passage 123 flows.

As shown in FIG. 1, the base portion 30 extends along the fan central axis CL in the suction space 224. One end of the base portion 30 in the fan central axis CL is joined with a suction partition panel 121 of the inside-outside air introduction portion 10. The other end of the base portion 30 extends to a position close to the center part of the fan boss 246 of the centrifugal fan 24.

The base portion 30 extends straight in a direction away from the fan central axis CL, as shown in FIG. 2. The base portion 30 extends to a position close to the blades 242 such that end portions 301, 302 farthest from the fan central axis CL in the base portion 30 does not contact the blades 242. The other end of the base portion 30 in the fan central axis CL is connected to an enlarged portion 32.

The enlarged portion 32 extends from a position close to the fan central axis CL toward the blades 242 to cover a part of the fan boss 246. The enlarged portion 32 is spaced from the fan boss 246 so as not to contact the fan boss 246.

A clearance passage 33 is defined between the enlarged portion 32 and the fan boss 246. A first space side opening 331 of the clearance passage 33 opens in the first space 224A and a second space side opening 332 of the clearance passage 33 opens in the second space 224B. The first space side opening 331 and the second space side opening 332 communicate with each other through the clearance passage 33.

In the vehicular air-conditioning device, the outside air whose humidity is lower than that of the inside air is blown toward the inside of the windshield, and the inside air is circulated in the passenger compartment in the inside-outside air mode. Accordingly, fogging of the windshield can be suppressed, and load on the air-conditioning can be reduced.

However, since the clearance passage 33 is defined between the enlarged portion 32 and the fan boss 246 in the blower 20, the inside air that is the second fluid may flow into the first space 224A through the clearance passage 33. If the inside air that is the second fluid flows into the first space 224A through the clearance passage 33, the air having a high humidity may be blown toward the windshield, and the windshield may be fogged. Since the fogging of the windshield may hinder the driving operation of the vehicle by a driver, it may be necessary to avoid the fogging.

In view of this points, the inventors of the present disclosure have studies about the characteristics of the fan of the blower 20. As a result, the inventors have found that the pressure on a leading edge 243 side of the suction space 224 of the centrifugal fan 24 tends to be lower than the pressure on the fan central axis CL side of the suction space 224 of the centrifugal fan 24. The reason why the pressure around the blades 242 is low is as follows. The centrifugal fan 24 applies centrifugal force on the air between the blades 242 to blow the air outward in the fan radial direction DR. Since the air is drawn from the leading edge 243 of the blade, the pressure around the leading edge 243 of the blade 242 is lower than the pressure around the fan central axis CL.

In the present embodiment, based on the above-described findings, the enlarged portion 32 is biased to the second space 224B in the suction space 224 such that the pressure at the second space side opening 332 of the clearance passage 33 is lower than the pressure at the first space side opening 331.

The enlarged portion 32 of the present embodiment has an extended portion in which a length between the fan central axis CL and an outer edge portion 320 facing the leading edge 243 of the blade 242 is longer than a predetermined reference length Lref. The enlarged portion 32 and the extended portion are biased to the second space 224B in the suction space 224. In the present embodiment, the reference length Lref is half of a length between the fan central axis CL and the leading edge 243 of the blade 242. The reference length Lref may be changed according to the type of the blower 20 or the like. For example, the reference length Lref may be a radius of a cylinder portion 321 described later.

Figure 4:
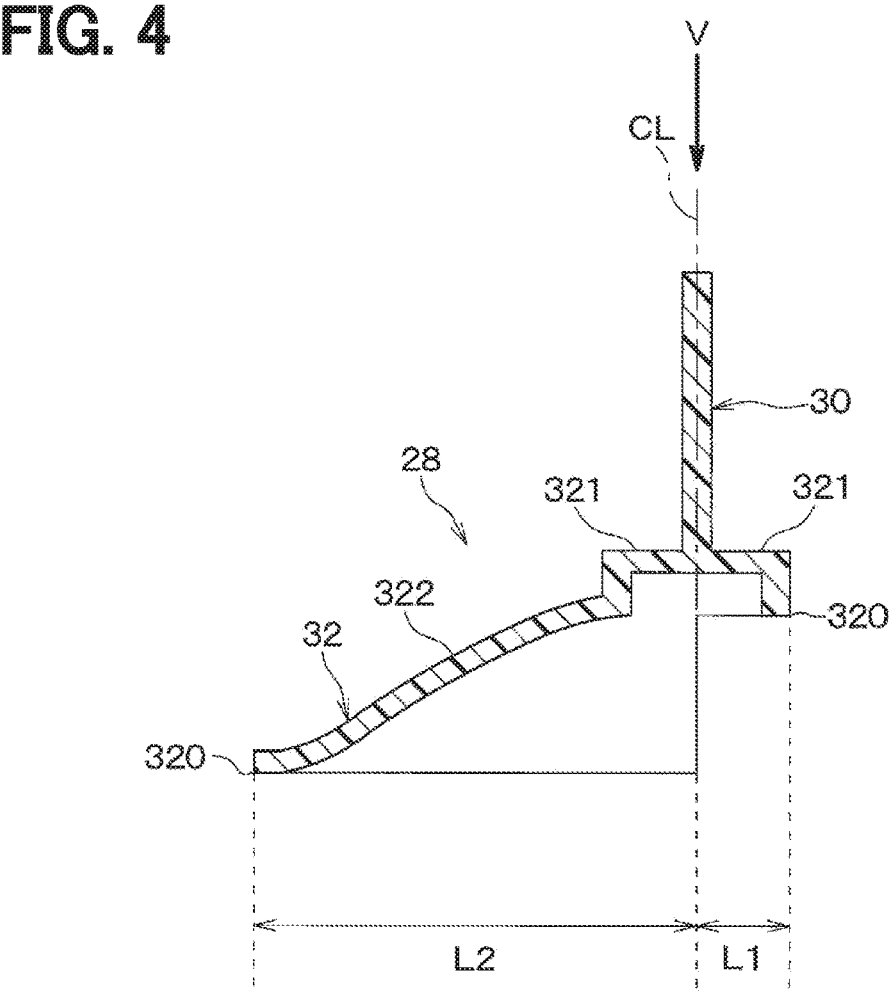
FIG. 4 is a cross-sectional view taken along the axial direction, schematically showing a partition wall according to at least one embodiment.
Figure 5:
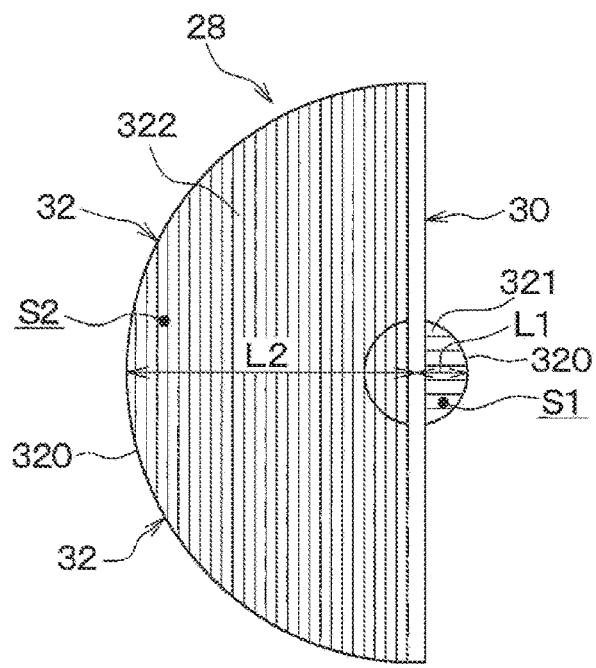
FIG. 5 is a diagram illustrating the partition wall according to at least one embodiment viewed along an arrow V in FIG. 4.

Specifically, as shown in FIGS. 4, 5, the enlarged portion 32 includes the cylinder portion 321 configured to cover the boss portion 246a of the fan boss 246, and a flange portion 322 protruding from the cylinder portion 321 outward in the fan radial direction DR.

The cylinder portion 321 has a bottomed cylinder shape configured to entirely cover the boss portion 246a of the fan boss 246. The cylinder portion 321 protrudes to the one side of the fan central axis CL so as not to interfere with the boss portion 246a of the fan boss 246.

The flange portion 322 of the present embodiment has a semicircular shape when viewed in a direction in which the fan central axis CL extends. The flange portion 322 extends to a position close to the blades 242 such that the outer edge portion 320 farthest from the fan central axis CL does not contact the blades 242. The flange portion 322 protrudes from the cylinder portion 321 outward in the fan radial direction DR such that the length between the fan central axis CL and the outer edge portion 320 is longer than the reference length Lref. In the present embodiment, the flange portion 322 is the extended portion of the enlarged portion 32.

In the enlarged portion 32, as shown in FIGS. 1, 2, a part of the cylinder portion 321 protrudes into the first space 224A, and the remaining parts of the cylinder portion 321 and the flange portion 322 protrude into the second space 224B. That is, the enlarged portion 32 of the present embodiment is configured to cover both a first fan boss portion 247a and a second fan boss portion 247b. In the enlarged portion 32 of the present embodiment, a length L2 between the fan central axis CL and the outer edge portion 320 in the second space 224B is longer than a length L1 between the fan central axis CL and the outer edge portion 320 in the first space 224A.

That is, the length of a part of the enlarged portion 32 covering the second fan boss portion 247b between the fan central axis CL and the outer edge portion 320 is longer than the length of a part of the enlarged portion 32 covering the first fan boss portion 247a between the fan central axis CL and the outer edge portion 320.

In the present embodiment, as shown in FIG. 5, an area S2 of the part of the enlarged portion 32 covering the second fan boss portion 247b is larger than an area S1 of the part of the enlarged portion 32 covering the first fan boss portion 247a. In FIG. 5, a part of the enlarged portion 32 covering the second fan boss portion 247b is indicated with vertical-line hatching, and a part of the enlarged portion 32 covering the first fan boss portion 247a is indicated with horizontal-line hatching.

Figure 6:
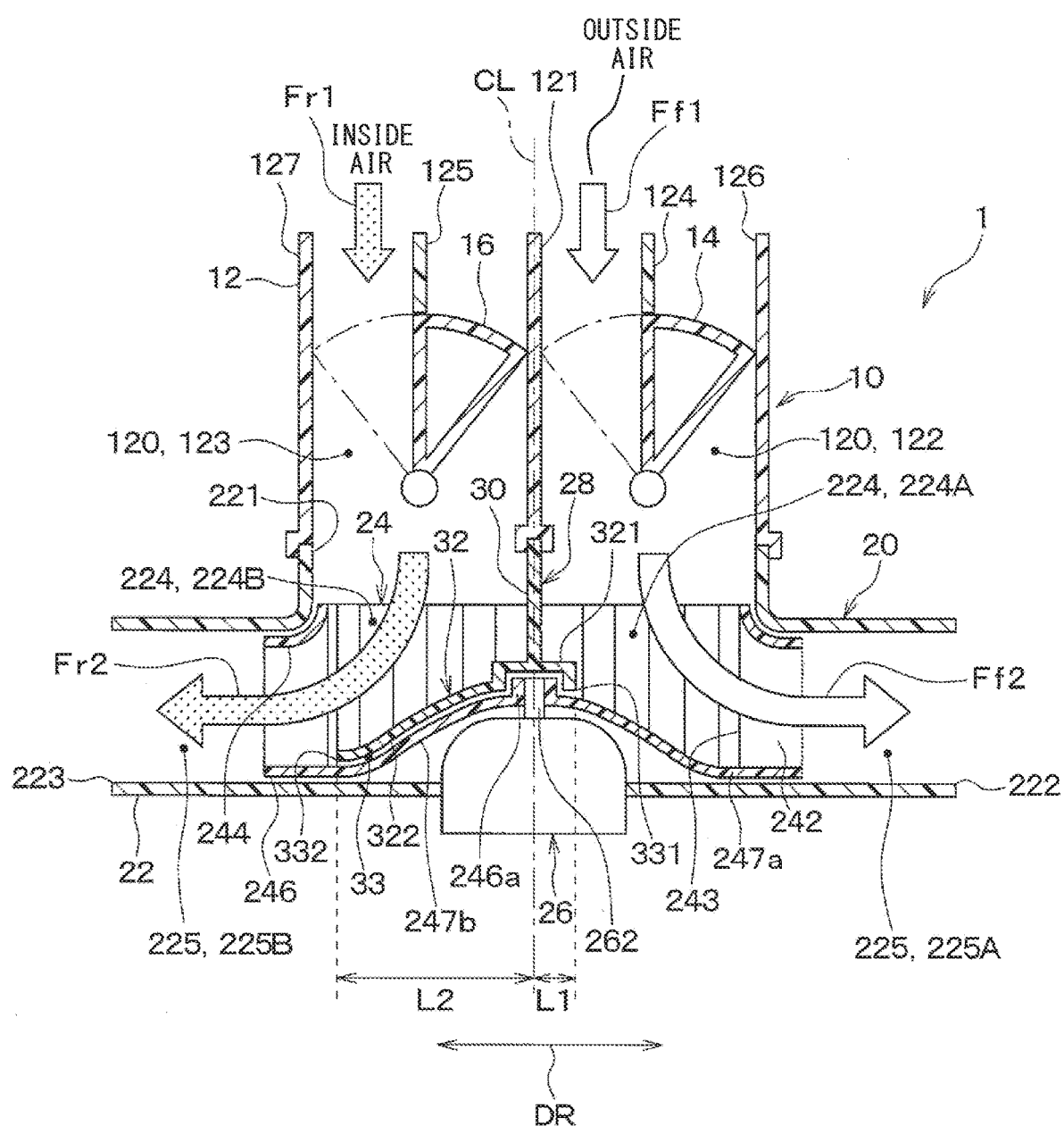
FIG. 6 is an explanatory diagram for explaining how air flows in the blower unit according to at least one embodiment.

Next, an operation of the blower unit 1 of the present embodiment in the inside-outside air mode will be described with reference to FIGS. 6, 7. In the blower unit 1, the first inside-outside air switching door 14 is controlled to open the outside air introduction port 124 and close the inside air introduction port 126 in the inside-outside air mode as shown in FIG. 6. When the centrifugal fan 24 is driven and rotated by the electric motor 26 in this state, the outside air is introduced into the first introduction passage 122 as indicated by an arrow Ff1 of FIG. 6, and the inside air is introduced into the second introduction passage 123 as indicated by an arrow Fr1 of FIG. 6.

The outside air introduced into the first introduction passage 122 is drawn into the centrifugal fan 24 through the first space 224A of the suction space 224, and then the air is blown outward in the fan radial direction DR into the first outflow passage 225A as indicated by an arrow Ff2 of FIG. 6. The temperature of the outside air blown into the first outflow passage 225A is adjusted in the temperature adjustment unit, and then the air is blown toward the inside of the windshield.

The inside air introduced into the second introduction passage 123 is drawn into the centrifugal fan 24 through the second space 224B of the suction space 224, and then the air is blown outward in the fan radial direction DR into the second outflow passage 225B as indicated by an arrow Fr2 of FIG. 6. The temperature of the inside air blown into the second outflow passage 225B is adjusted in the temperature adjustment unit, and then the air is blown toward the occupants in the passenger compartment.

In the blower 20 of the present embodiment, the enlarged portion 32 is biased to the second space 224B such that the pressure around the second space side opening 332 of the clearance passage 33 is lower than the pressure around the first space side opening 331.

Figure 7:
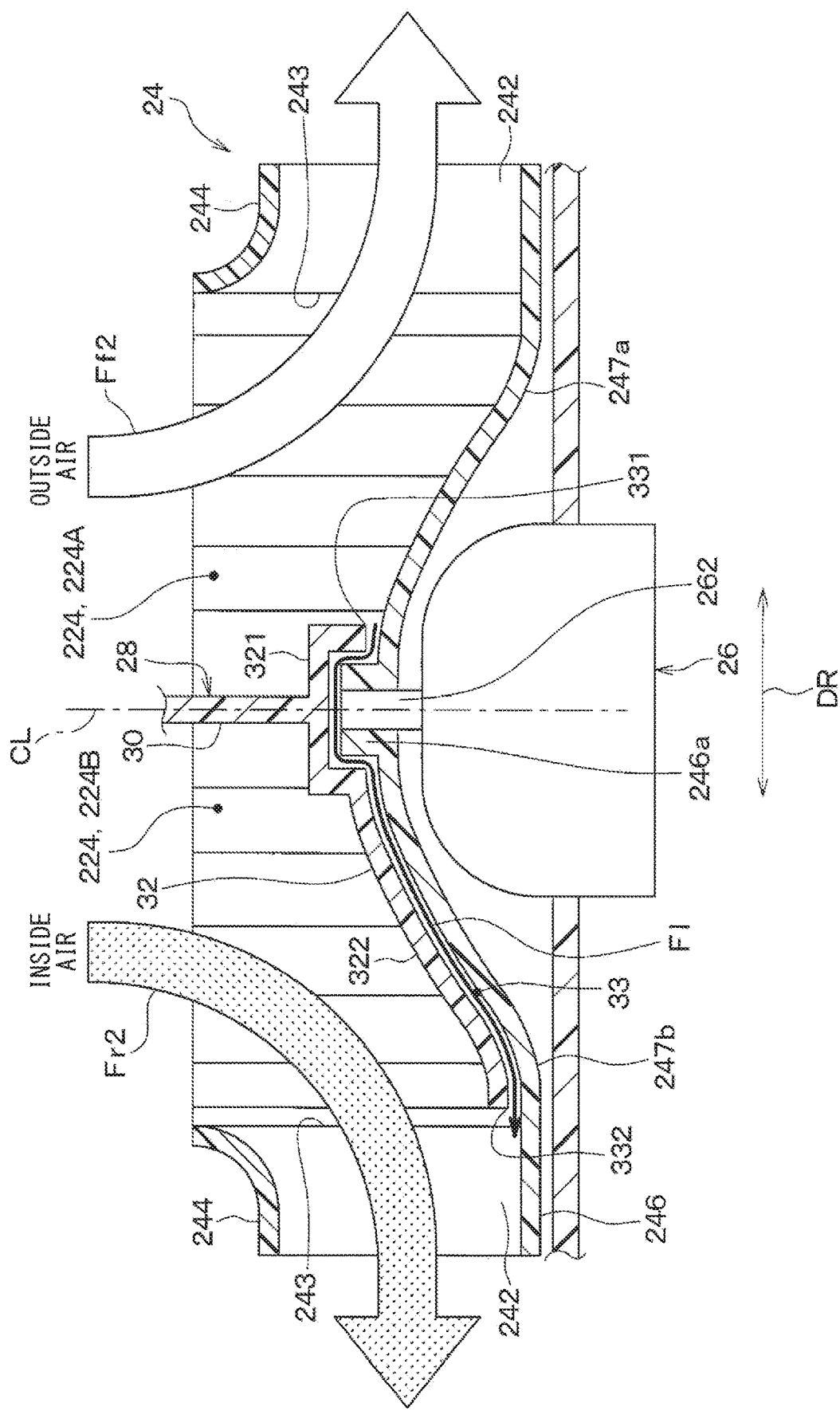
FIG. 7 is an explanatory diagram for explaining how air flows in a clearance passage according to at least one embodiment.

Accordingly, in the clearance passage 33 defined between the enlarged portion 32 and the fan boss 246, the flow of the outside air toward the second space 224B is dominant as indicated by an arrow Fl of FIG. 7. Accordingly, the inside air is unlikely to flow through the clearance passage 33 to the first space 224A.

According to the above-described present embodiment, in the blower 20 in which the suction space 224 of the centrifugal fan 24 is partitioned by the partition wall 28 into the first space 224A through which the outside air flows and the second space 224B through which the inside air flows, the inflow of the inside air to the first space 224A can be suppressed. As a result, the air (i.e. outside air) having a low humidity can be supplied toward the inside of the windshield.

In the blower 20 of the present embodiment, both the first fan boss portion 247a and the second fan boss portion 247b are covered with the enlarged portion 32. Accordingly, the clearance passage 33 defined between the fan boss 246 and the enlarged portion 32 can be sufficiently secured, and the mixing of the outside air and the inside air can be suppressed. Since the area of the second fan boss portion 247b covered with the enlarged portion 32 is larger than the area of the first fan boss portion 247a covered with the enlarged portion 32, the inflow of the inside air to the first space 224A through the clearance passage 33 can be suppressed.

In the present embodiment, the length of a part of the enlarged portion 32 covering the second fan boss portion 247b between the fan central axis CL and the outer edge portion 320 is longer than the length of a part of the enlarged portion 32 covering the first fan boss portion 247a between the fan central axis CL and the outer edge portion 320 facing the leading edge 243. Accordingly, since the second space side opening 332 of the clearance passage 33 is closer to the blades 242 than the first space side opening 331 is to the blades 242, the pressure at the second space side opening 332 can be lower than the pressure at the first space side opening 331.

Second Embodiment

The present embodiment will be described with reference to FIGS. 8 and 9. In the blower 20 of the present embodiment, the shape of the enlarged portion 32 is different from that in the first embodiment. In the present embodiment, parts different from the first embodiment will be mainly described, and description of the same parts as the first embodiment will be omitted.

Figure 8:
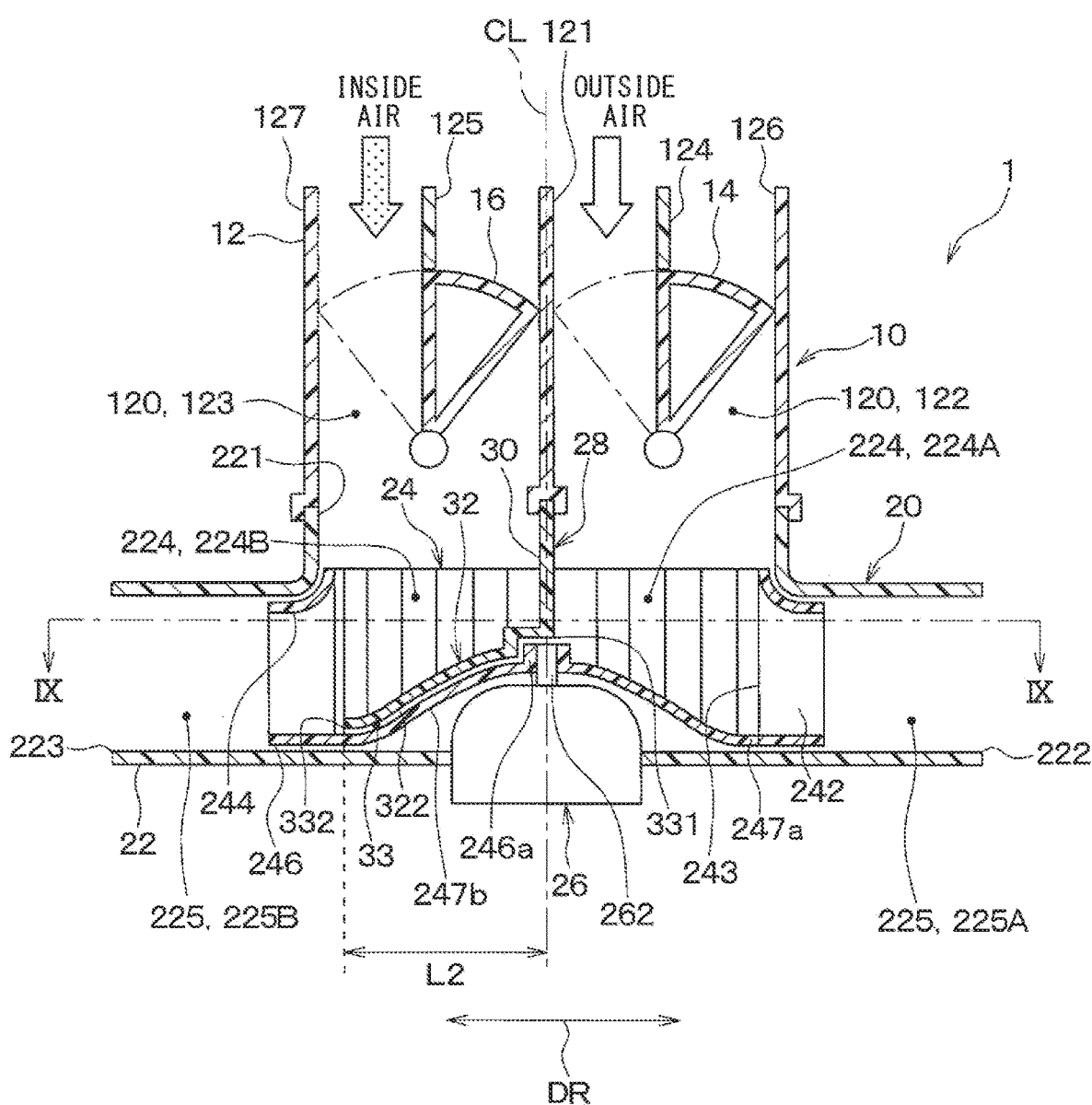
FIG. 8 is a cross-sectional diagram taken along an axial direction, schematically showing a blower unit including a blower according to at least one embodiment.
Figure 9:
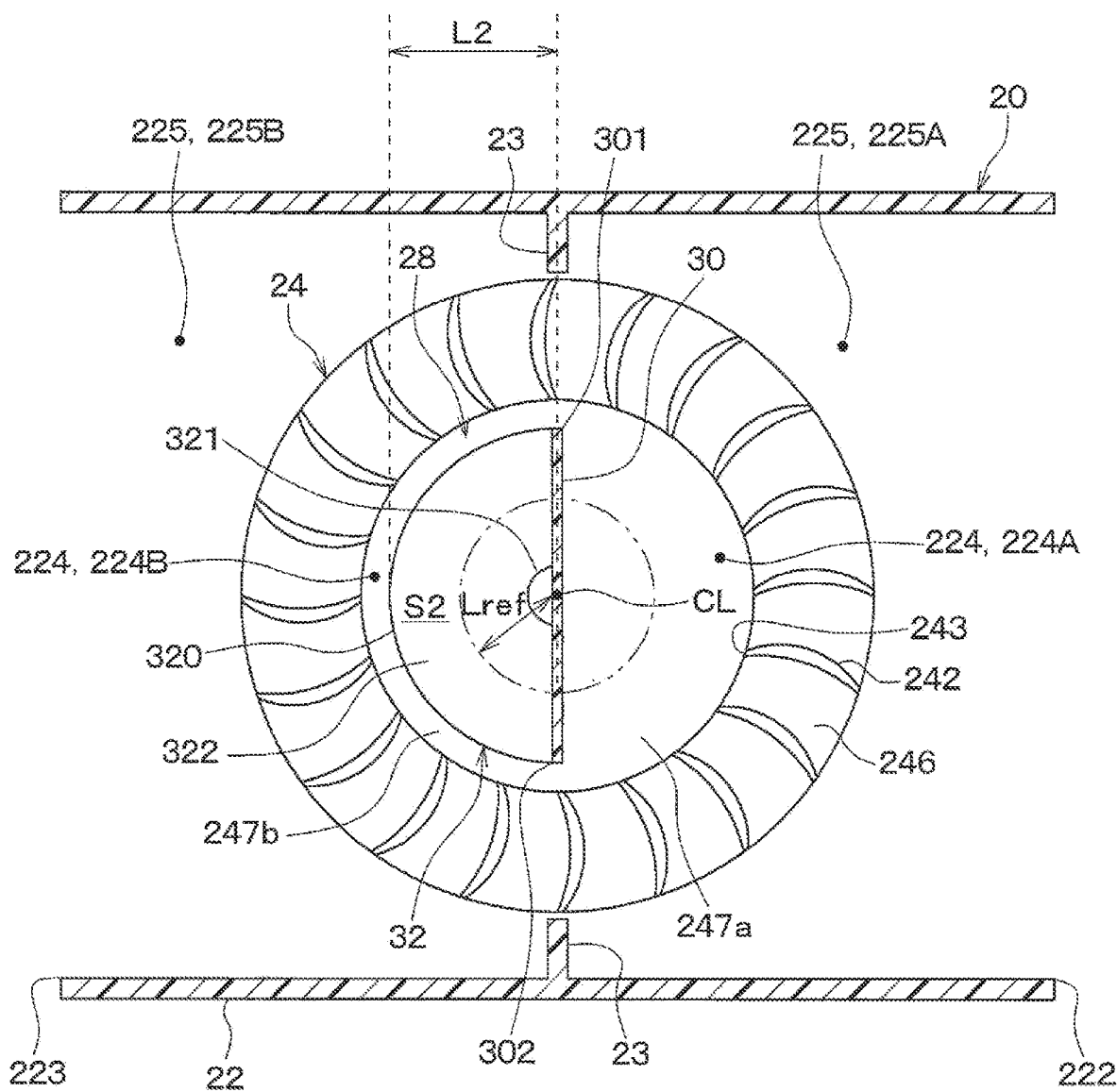
FIG. 9 is a cross-sectional view taken along line IX-IX in FIG. 8.

As shown in FIGS. 8, 9, the enlarged portion 32 of the blower 20 of the present embodiment covers only the second fan boss portion 247b in the first fan boss portion 247a and the second fan boss portion 247b.

Specifically, the cylinder portion 321 of the enlarged portion 32 of the present embodiment has a bottomed semicircular cylinder shape covering a half of the boss portion 246a of the fan boss 246. The enlarged portion 32 is disposed in the suction space 224 and protrudes only into the second space 224B to cover the second fan boss portion 247b of the fan boss portion.

Since the enlarged portion 32 of the present embodiment does not protrude into the first space 224A, the length between the fan central axis CL and the outer edge portion 320 in the first space 224A is zero. Accordingly, in the enlarged portion 32, the length L2 from the fan central axis CL to the outer edge portion 320 in the second space 224B is longer than that in the first space 224A.

Since the enlarged portion 32 of the present embodiment does not protrude into the first space 224A, the area of the first fan boss portion 247a covered with the enlarged portion 32 is zero. Accordingly, the area S2 of the part of the enlarged portion 32 covering the second fan boss portion 247b is larger than the area S1 of the part of the enlarged portion 32 covering the first fan boss portion 247a.

The other configurations are the same as those of the first embodiment. The blower 20 in the present embodiment having the common configuration to the first embodiment can achieve the same advantages as those in the first embodiment. Specifically, in the blower 20 of the present embodiment, the enlarged portion 32 covers only the second fan boss portion 247b.

Accordingly, the difference between the pressure at the second space side opening 332 and the pressure at the first space side opening 331 of the clearance passage 33 defined between the fan boss 246 and the enlarged portion 32 can be sufficiently secured. As a result, the outside air is likely to flow to the second space 224B, and the inflow of the inside air into the first space 224A can be suppressed.

Third Embodiment

The present embodiment will be described with reference to FIGS. 10 and 11. In the blower 20 of the present embodiment, the shape of the enlarged portion 32 is different from that in the first embodiment. In the present embodiment, parts different from the first embodiment will be mainly described, and description of the same parts as the first embodiment will be omitted.

Figure 10:
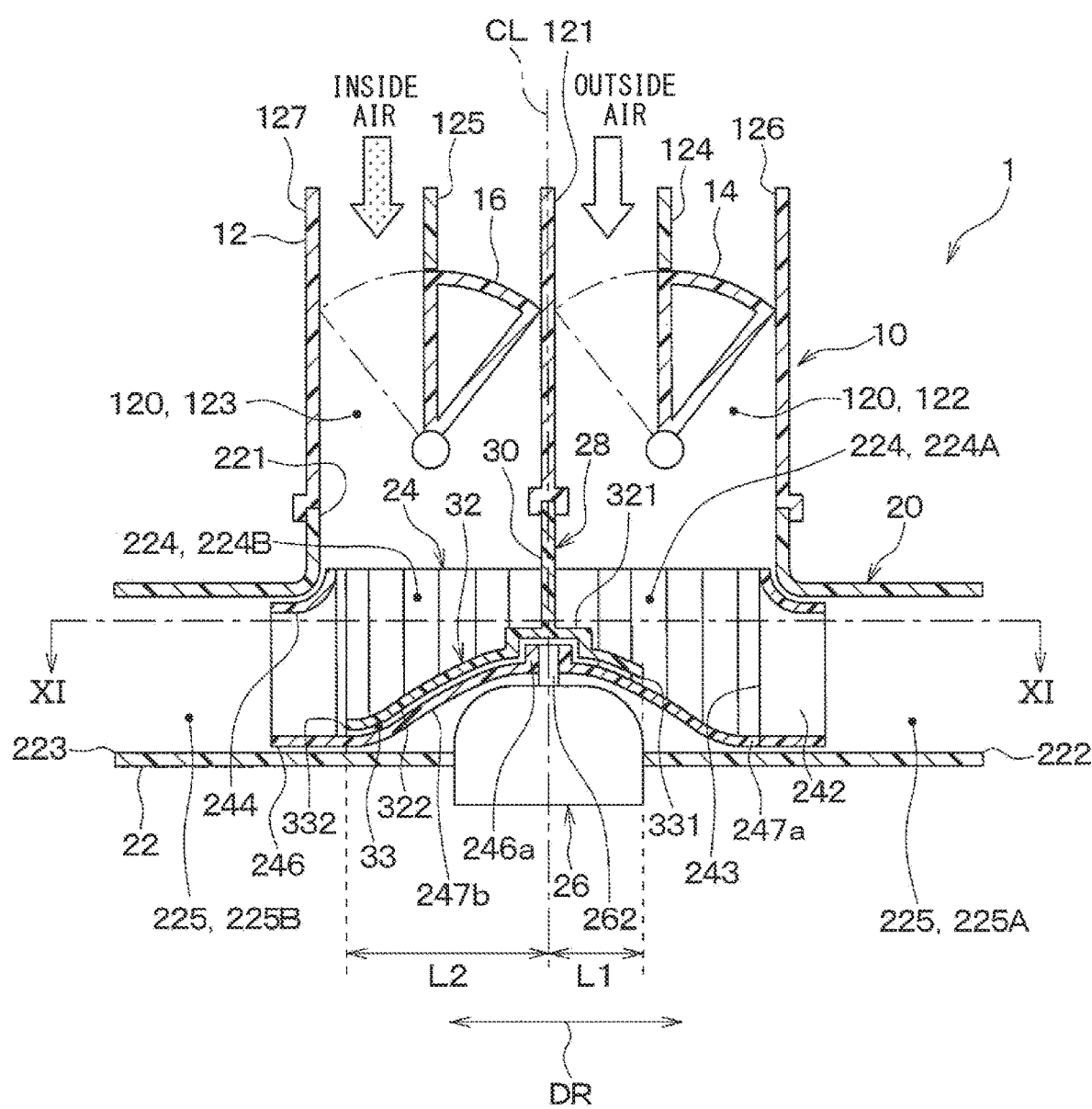
FIG. 10 is cross-sectional diagram taken along an axial direction, schematically showing a blower unit including a blower according to according to at least one embodiment.
Figure 11:
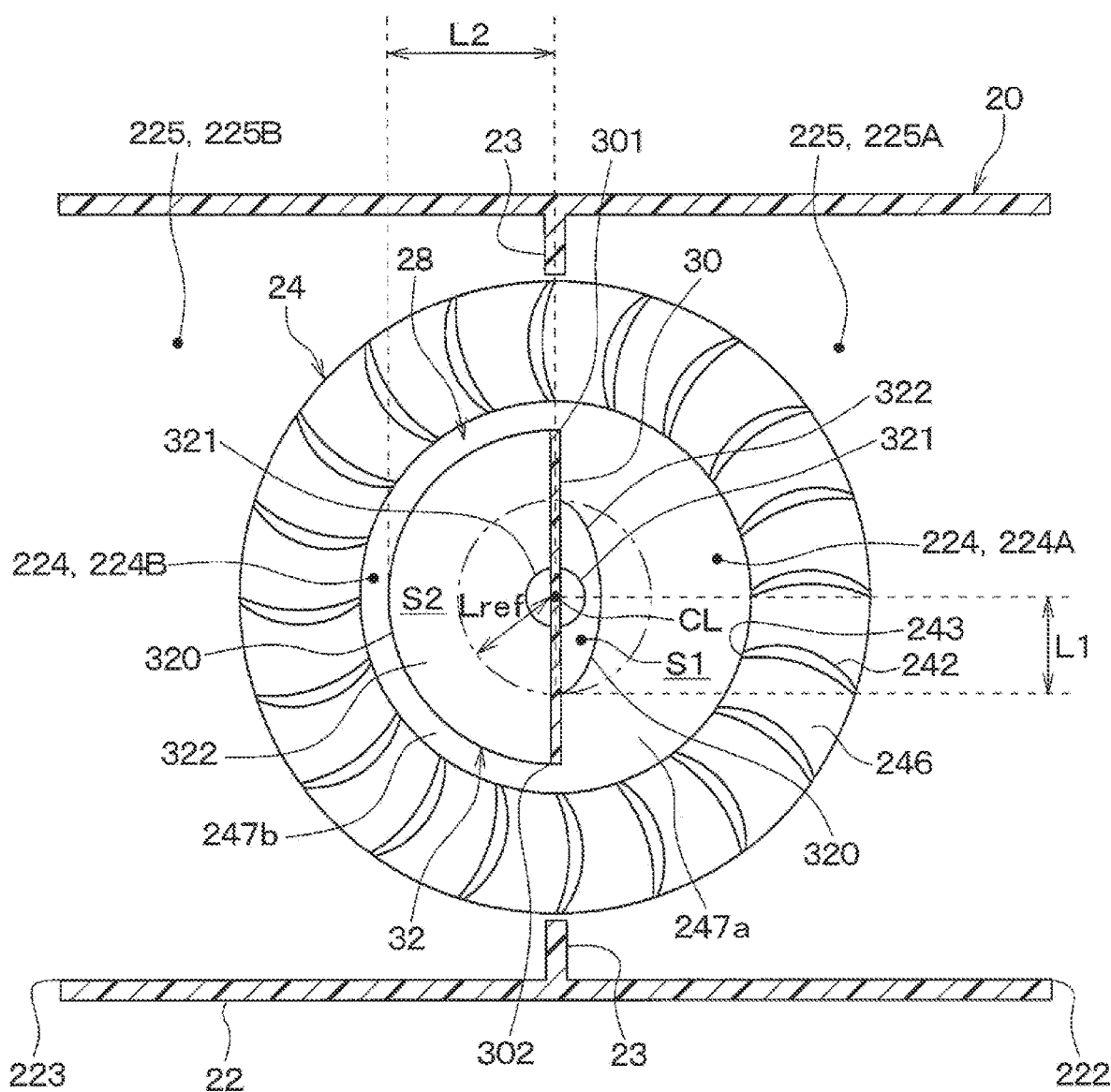
FIG. 11 is a cross-sectional view taken along line XI-XI in FIG. 10.

As shown in FIGS. 10, 11, the enlarged portion 32 of the present embodiment has a shape of a combination of a semicircle and a semi-ellipse when viewed in the direction in which the fan central axis CL extends. A semi-major axis of the semi-ellipse part of the enlarged portion 32 is smaller than the radius of the semicircle part of the enlarged portion 32.

The enlarged portion 32 of the present embodiment is disposed in the suction space 224 such that the semicircle part covers the second fan boss portion 247b and the semi-ellipse part covers the first fan boss portion 247a.

In the enlarged portion 32 of the present embodiment, a length L2 between the fan central axis CL and the outer edge portion 320 in the second space 224B is longer than a length L1 between the fan central axis CL and the outer edge portion 320 in the first space 224A. In the present embodiment, an area S2 of the part of the enlarged portion 32 covering the second fan boss portion 247b is larger than an area S1 of the part of the enlarged portion 32 covering the first fan boss portion 247a.

The other configurations are the same as those of the first embodiment. In the blower 20 of the present embodiment as in the first embodiment, the enlarged portion 32 is biased to the second space 224B such that the pressure around the second space side opening 332 of the clearance passage 33 is lower than the pressure around the first space side opening 331. Accordingly, in the blower 20 of the present embodiment, the inflow of the inside air into the first space 224A can be suppressed.

Fourth Embodiment

The present embodiment will be described with reference to FIGS. 12 and 13. In the blower 20 of the present embodiment, the shape of the enlarged portion 32 is different from that in the first embodiment. In the present embodiment, parts different from the first embodiment will be mainly described, and description of the same parts as the first embodiment will be omitted.

Figure 12:
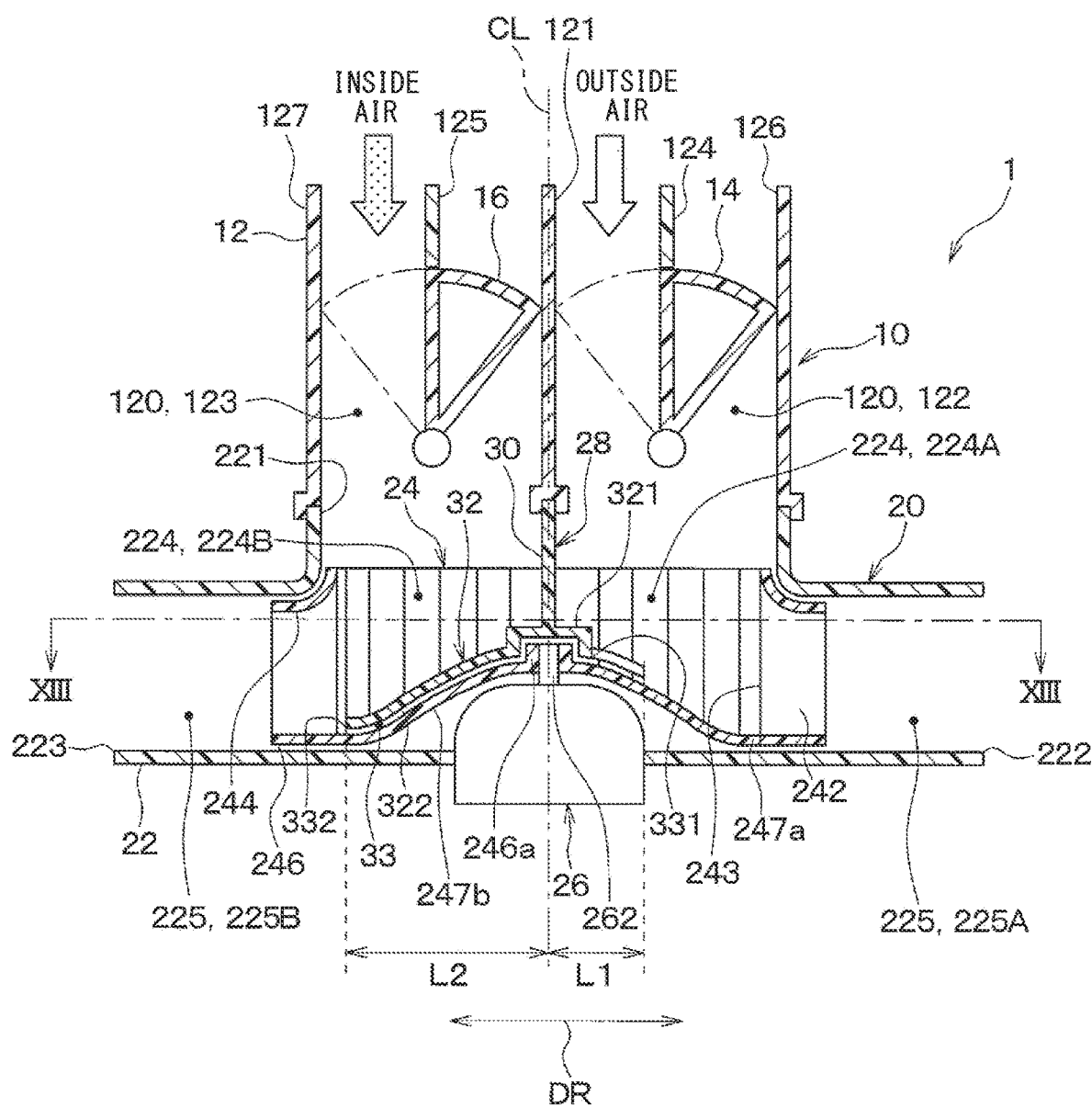
FIG. 12 is a cross-sectional diagram taken along an axial direction, schematically showing a blower unit including a blower according to according to at least one embodiment.
Figure 13:
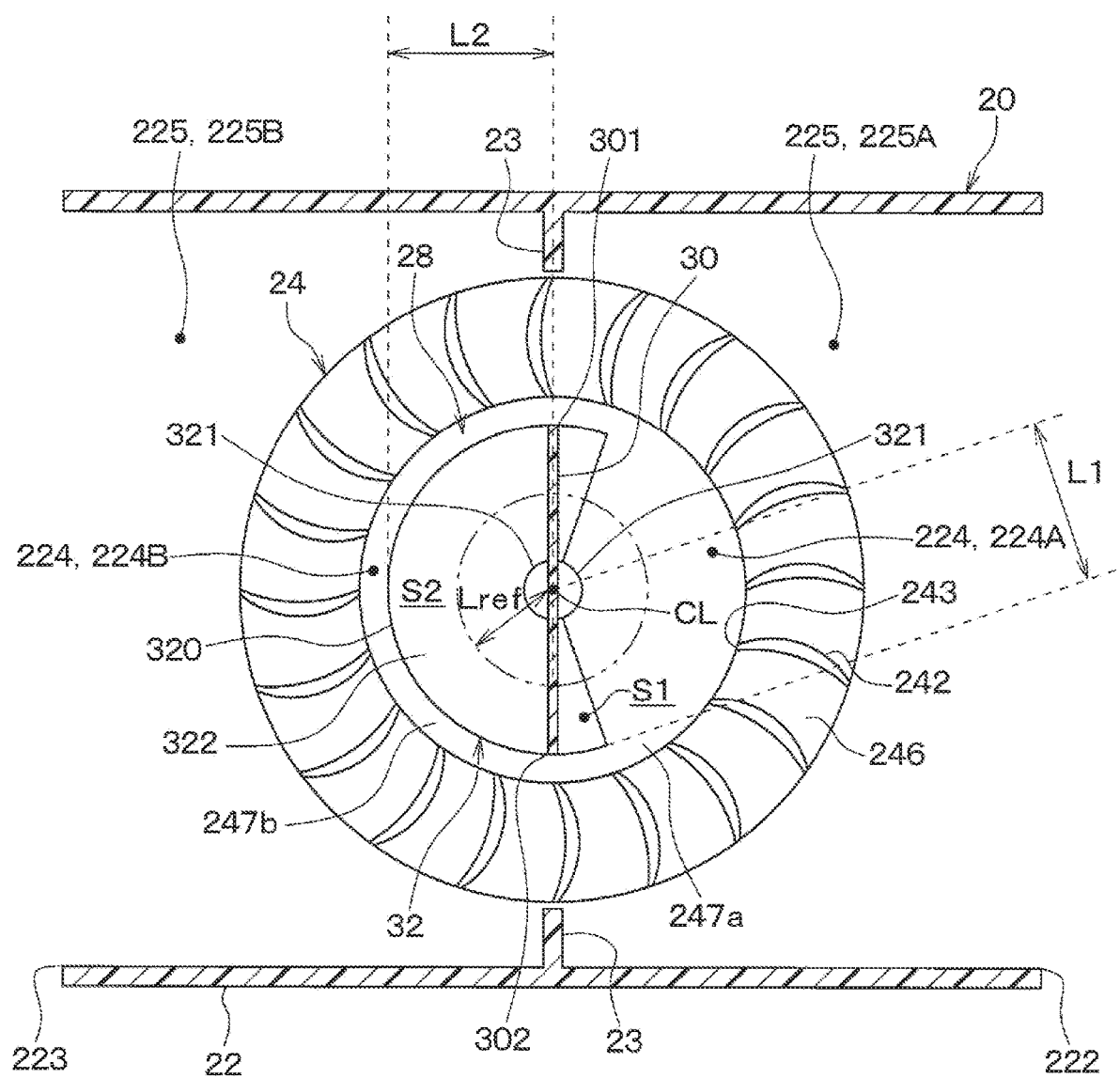
FIG. 13 is a sectional view taken along line XIII-XIII of FIG. 12.

As shown in FIGS. 12, 13, the enlarged portion 32 of the blower 20 of the present embodiment has a shape of a combination of a semicircle and fan shapes when viewed in the direction in which the fan central axis CL extends. A radius of the fan-shape part of the enlarged portion 32 is the same as the radius of the semicircle part of the enlarged portion 32.

The enlarged portion 32 of the present embodiment is disposed in the suction space 224 such that the semicircle part covers the second fan boss portion 247b and the fan-shape parts cover the first fan boss portion 247a.

In the enlarged portion 32 of the present embodiment, a length L2 between the fan central axis CL and the outer edge portion 320 in the second space 224B is the same as a length L1 between the fan central axis CL and the outer edge portion 320 in the first space 224A.

The extended portion of the enlarged portion 32 in which the length from the fan central axis CL to the outer edge portion 320 is longer than the reference length Lref is biased to the second space 224B in the suction space 224. In the present embodiment, an area S2 of the part of the enlarged portion 32 covering the second fan boss portion 247b is larger than an area S1 of the part of the enlarged portion 32 covering the first fan boss portion 247a.

Accordingly, although the pressure at the second space side opening 332 of the clearance passage 33 is partially the same as the pressure at the first space side opening 331 in the blower 20 of the present embodiment, the pressure at the second space side opening 332 is lower than the pressure at the first space side opening 331 as a whole. That is, in the blower 20 of the present embodiment, the enlarged portion 32 is biased to the second space 224B such that the pressure around the second space side opening 332 of the clearance passage 33 is lower than the pressure around the first space side opening 331.

The other configurations are the same as those of the first embodiment. According to the blower 20 of the present embodiment, the inflow of the inside air into the first space 224A of the suction space 224 can be suppressed as in the first embodiment.

Fifth Embodiment

The present embodiment will be described with reference to FIGS. 14 and 15. In the blower 20 of the present embodiment, the shape of the enlarged portion 32 is different from that in the first embodiment. In the present embodiment, parts different from the first embodiment will be mainly described, and description of the same parts as the first embodiment will be omitted.

Figure 14:
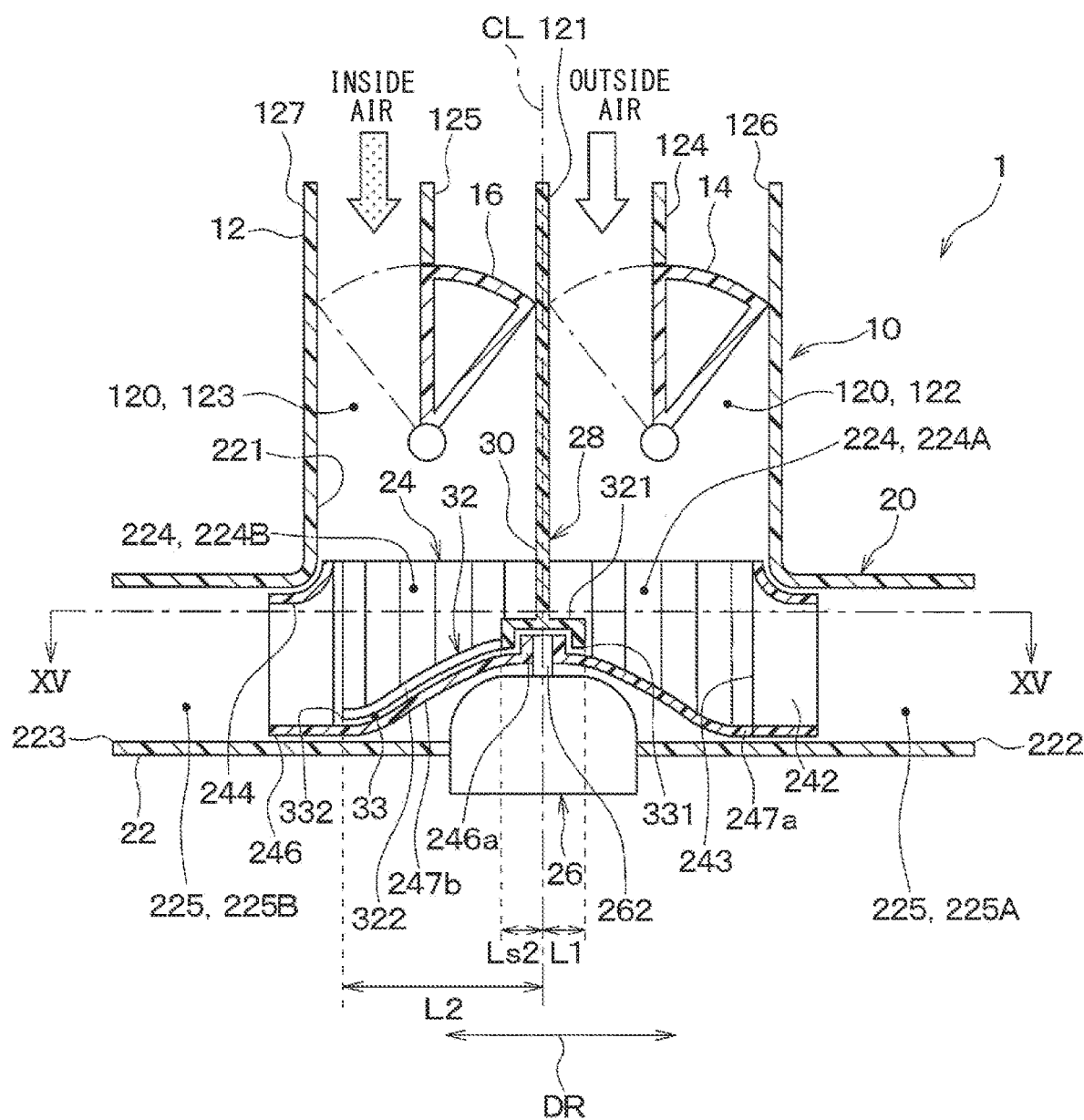
FIG. 14 is a cross-sectional diagram taken along an axial direction, schematically showing a blower unit including a blower according to according to at least one embodiment.
Figure 15:
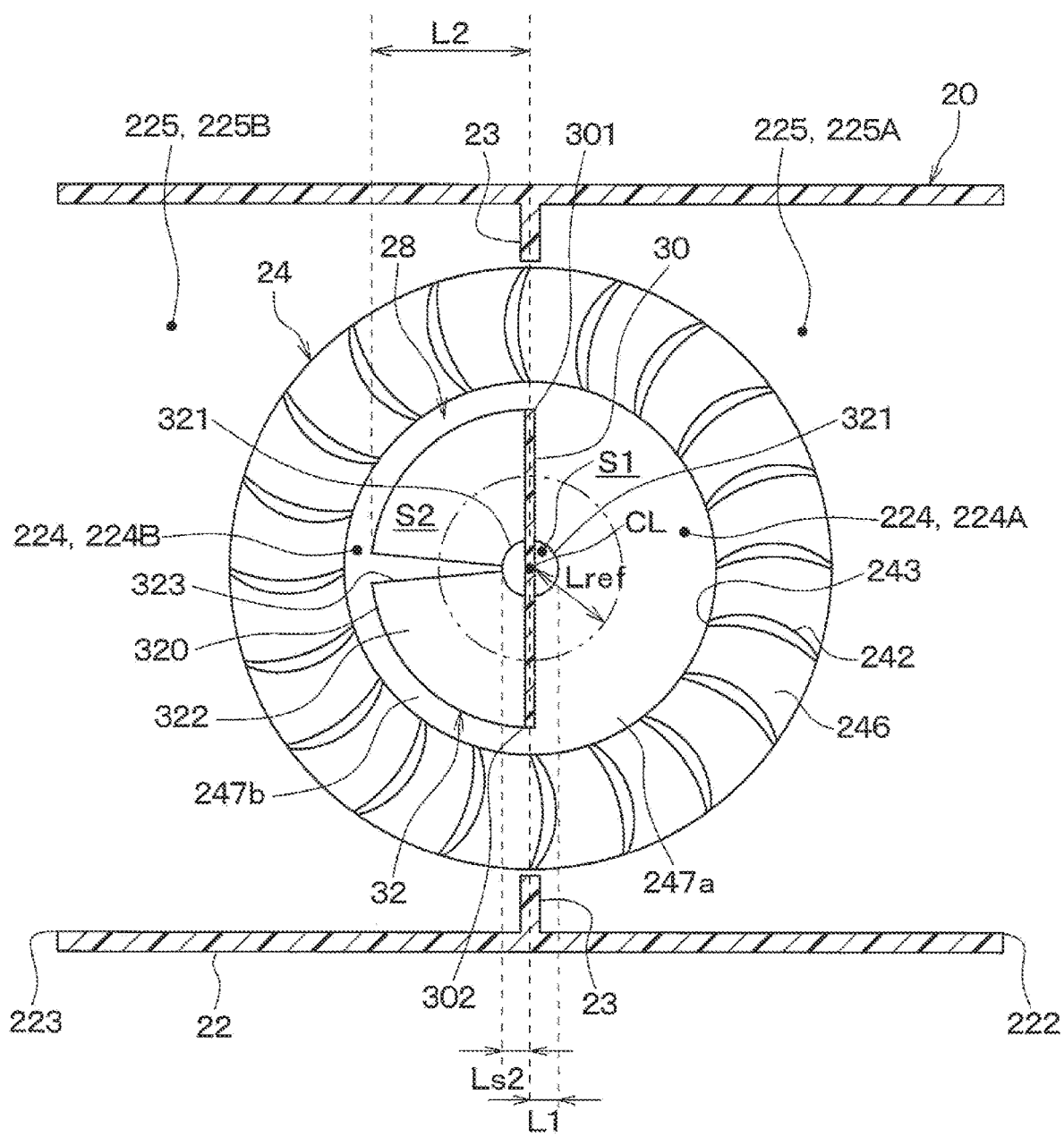
FIG. 15 is a cross-sectional view taken along a line XV-XV in FIG. 14.

As shown in FIGS. 14, 15, the enlarged portion 32 of the present embodiment has a semicircular shape in which a notch portion 323 recessed inward in the fan radial direction DR is formed when viewed in the direction in which the fan central axis CL extends.

Specifically, the notch portion 323 having a fan shape is formed in the flange portion 322 of the enlarged portion 32 of the present embodiment. The notch portion 323 extends from the outer edge portion 320 to the cylinder portion 321. The enlarged portion 32 of the present embodiment is disposed in the suction space 224 such that the flange portion 322 having the notch portion 323 covers the second fan boss portion 247b.

In the enlarged portion 32 of the present embodiment, a length Ls2 between the fan central axis CL and the outer edge portion 320 in the second space 224B at which the notch portion 323 is formed is the same as a length L1 between the fan central axis CL and the outer edge portion 320 in the first space 224A.

The extended portion of the enlarged portion 32 in which the length from the fan central axis CL to the outer edge portion 320 is longer than the reference length Lref is biased to the second space 224B in the suction space 224. In the present embodiment, an area S2 of the part of the enlarged portion 32 covering the second fan boss portion 247b is larger than an area S1 of the part of the enlarged portion 32 covering the first fan boss portion 247a.

Accordingly, although the pressure at the second space side opening 332 of the clearance passage 33 is partially the same as the pressure at the first space side opening 331 in the blower 20 of the present embodiment, the pressure at the second space side opening 332 is lower than the pressure at the first space side opening 331 as a whole. That is, in the blower 20 of the present embodiment, the enlarged portion 32 is biased to the second space 224B such that the pressure around the second space side opening 332 of the clearance passage 33 is lower than the pressure around the first space side opening 331.

The other configurations are the same as those of the first embodiment. According to the blower 20 of the present embodiment, the inflow of the inside air into the first space 224A of the suction space 224 can be suppressed as in the first embodiment.

Sixth Embodiment

The present embodiment will be described with reference to FIG. 16. In the blower 20 of the present embodiment, the shape of the base portion 30 is different from that in the first embodiment. In the present embodiment, parts different from the first embodiment will be mainly described, and description of the same parts as the first embodiment will be omitted.

Figure 16:
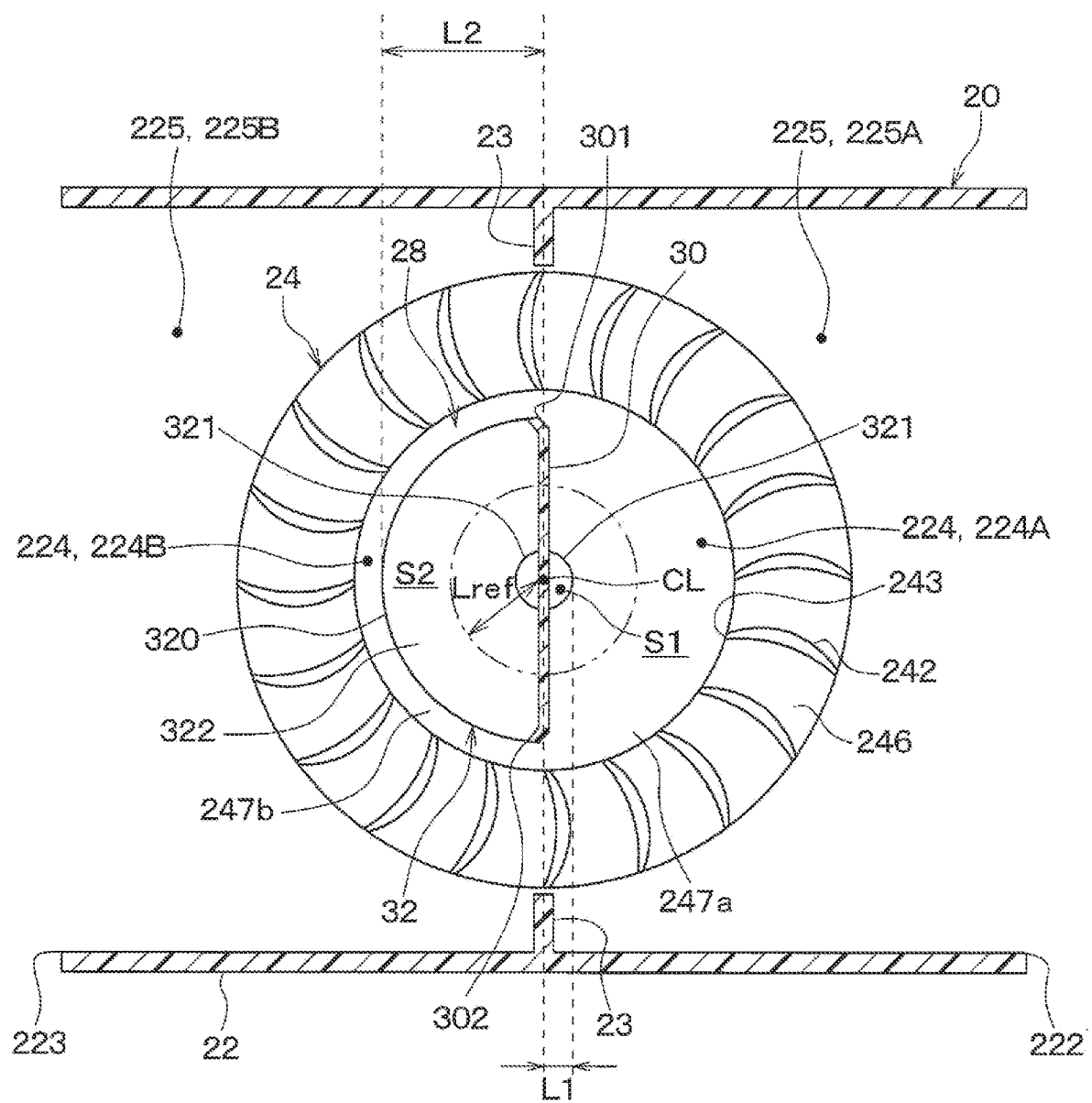
FIG. 16 is a schematic cross-sectional view of a blower according to at least one embodiment.

As shown in FIG. 16, end portions 301, 302 of the base portion 30 of the present embodiment facing the blades 242 are closer to the second outflow passage 225B than the remaining parts of the base portion 30 around the fan central axis CL are to the second outflow passage 225B. That is, the end portions 301, 302 of the base portion 30 facing the blades 242 are bent toward the second outflow passage 225B.

The other configurations are the same as those of the first embodiment. The blower 20 in the present embodiment having the common configuration to the first embodiment can achieve the same advantages as those in the first embodiment. Specifically, in the present embodiment, the end portions 301, 302 of the base portion 30 facing the blades 242 are closer to the second outflow passage 225B than the remaining parts of the base portion 30 around the fan central axis CL are to the second outflow passage 225B. Accordingly, the air in the first space 224A is likely to flow into the second space 224B through the clearance between the base portion 30 and the blades 242, inflow of the outside air to the second space 224B can be suppressed.

Other Embodiments

Although representative embodiments of the present disclosure have been described above, the present disclosure is not limited to the embodiments described above, and various modifications can be made, for example, as follows.

In the above-described embodiments, the suction partition panel 121 of the inside-outside air introduction portion 10 and the partition wall 28 of the blower 20 are separated members and connected with each other. However, the present disclosure is not limited to this. The blower 20 may have a single component in which the suction partition panel 121 of the inside-outside air introduction portion 10 and the partition wall 28 of the blower 20 are integrated with each other.

In the first to fifth embodiments, the base portion 30 extends straight in the direction away from the fan central axis CL. However, the base portion 30 is not limited to this. For example, the base portion 30 may has a shape bent in L-shape.

In the above-described embodiments, the temperature adjustment unit of the vehicular air-conditioning device is located downstream of the blower 20. However, the vehicular air-conditioning device is not limited to this. For example, in the vehicular air-conditioning device, the temperature adjustment unit may be located upstream of the blower 20. Further, in the vehicular air-conditioning device, a cooling heat exchanger may be located upstream of the blower 20, and a heating heat exchanger may be located downstream of the blower 20.

In each of the embodiments described above, examples are described in which the blower 20 of the present disclosure is applied to a vehicular air-conditioning device, but these examples are not limiting. The blower 20 of the present disclosure can be applied to devices (e.g. humidifier) which need to avoid the mixing of the second fluid and the first fluid.

In the embodiments described above, it is needless to say that the elements configuring the embodiments are not necessarily essential except in the case where those elements are clearly indicated to be essential in particular, the case where those elements are considered to be obviously essential in principle, and the like.

In the embodiments described above, the present disclosure is not limited to the specific number of components of the embodiments, except when numerical values such as the number, numerical values, quantities, ranges, and the like are referred to, particularly when it is expressly indispensable, and when it is obviously limited to the specific number in principle, and the like.

In the embodiments described above, when referring to the shape, positional relationship, and the like of a component and the like, the present disclosure is not limited to the shape, positional relationship, and the like, except for the case of being specifically specified, the case of being fundamentally limited to a specific shape, positional relationship, and the like, and the like.

Conclusion

According to a first aspect described in some or all of the embodiments, the blower includes the clearance passage defined between the enlarged portion and the fan boss, and the first space side opening that opens in the first space and the second space side opening that opens in the second space communicate through the clearance passage. The enlarged portion of the partition wall is biased to the second space such that the pressure at the second space side opening is lower than the pressure at the first space side opening.

According to a second aspect described in some or all of the embodiments, the enlarged portion of the blower has the extended portion in which a length between the fan central axis CL and the outer edge portion facing the leading edge of the blade is longer than the predetermined reference length. The extended portion of the enlarged portion is biased to the second space in the suction space.

According to a third aspect, the area of the enlarged portion covering the fan boss in the second space is larger than the area of the enlarged portion covering the fan boss in the first space. Accordingly, the clearance passage defined between the fan boss and the enlarged portion is longer in the second space than in the first space, and the inflow of the second fluid into the first space through the clearance passage can be sufficiently suppressed.

According to a fourth aspect, the enlarged portion of the blower covers the first fan boss portion and the second fan boss portion, and the area of the enlarged portion covering the second fan boss portion is larger than the area of the enlarged portion covering the first fan boss portion. The first fan boss portion is a part of the fan boss located in the first space. The second fan boss portion is a part of the fan boss located in the second space.

According to a fifth embodiment, in the blower, a part of the enlarged portion covering the second fan boss portion has a length from the fan central axis to the outer edge portion facing the leading edges of the blades, and the length is longer than that of a part of the enlarged portion covering the first fan boss portion. Accordingly, in the clearance passage defined between the fan boss and the enlarged portion, the opening portion that opens in the second space is closer to the blades than the opening portion that opens in the first space is to, and the pressure at the opening portion in the second space is lower than the pressure at the opening portion in the first space.

According to a sixth aspect, the enlarged portion of the blower covers only the second fan boss portion in the first fan boss portion and the second fan boss portion. Accordingly, the difference between the pressure at the second space side opening and the pressure at the first space side opening of the clearance passage defined between the fan boss and the enlarged portion can be sufficiently secured. As a result, the first fluid is likely to flow to the second space, and the inflow of the second fluid into the first space can be suppressed.

According to a seventh aspect, the blower is used in the vehicular air-conditioning device configured to perform the inside-outside air mode in which the outside air is introduced from the outside of the passenger compartment and the inside air introduced from the passenger compartment circulates in the passenger compartment. The first fluid is the outside air. The second fluid is the inside air. Accordingly, inside the blower, the inflow of the inside air into the space through which the outside air flows can be suppressed, and the air (i.e. the outside air) having a low humidity can be supplied to the inside of the windshield, for example.

What is claimed is:

1. A blower configured to blow a first fluid and a second fluid, the blower comprising:
    a centrifugal fan configured to rotate about a fan central axis so as to draw the first fluid and the second fluid from one side of the fan central axis and blow the first fluid and the second fluid outward in a direction away from the fan central axis; and
    a partition wall that is disposed in a suction space defined on an air suction side of the centrifugal fan, the partition wall being spaced from the centrifugal fan, wherein
    the centrifugal fan includes
        a plurality of blades arranged around the suction space and spaced from each other, the plurality of blades being configured to draw an air from the one side of the fan central axis by rotating about the fan central axis, and
        a fan boss that connects an end of each blade of the plurality of blades on another side of the fan central axis with each other,
    the partition wall has
        a base portion that extends along the fan central axis in the suction space so as to partition the suction space at least into a first space through which the first fluid flows and a second space through which the second fluid flows, and
        an enlarged portion connected to an end of the base portion on the other side of the fan central axis, the enlarged portion extending in a direction from the fan central axis toward the plurality of blades so as to cover a part of the fan boss, the base portion extends in the direction away from the fan central axis such that both ends farthest from the fan central axis in the base portion face the plurality of blades with a gap, a clearance passage is defined between the enlarged portion and the fan boss, the clearance passage has a first space side opening that opens in the first space and a second space side opening that opens in the second space, the first space side opening and the second space side opening communicate with each other through the clearance passage, the enlarged portion is biased in the suction space to the second space such that a pressure at the second space side opening is less than a pressure at the first space side-opening, and an area of a part of the enlarged portion covering the fan boss in the second space is larger than an area of a part of the enlarged portion covering the fan boss in the first space.

2. A blower configured to blow a first fluid and a second fluid, the blower comprising:

a centrifugal tan configured to rotate about a fan central axis so as to draw the first fluid and the second fluid from one side of the fan central axis and blow the first fluid and the second fluid outward in a direction away from the fan central axis; and a partition wall that is disposed in a suction space defined on an air suction side of the centrifugal fan, the partition wall being spaced from the centrifugal fan, wherein the centrifugal fan includes a plurality of blades arranged around the suction space and spaced from each other, the plurality of blades being configured to draw an air from the one side of the fan central axis by rotating about the fan central axis, and a fan boss that connects an end of each blade of the plurality of blades on another side of the fan central axis with each other, the partition wall has a base portion that extends along the fan central axis in the suction space so as to partition the suction space at least into a first space through which the first fluid flows and a second space through which the second fluid flows, and an enlarged portion connected to an end of the base portion on the other side of the fan central axis, the enlarged portion extending in a direction from the fan central axis toward the plurality of blades so as to cover a part of the fan boss, the base portion extends in the direction away from the tan central axis such that both ends farthest from the fan central axis in the base portion face the plurality of blades with a gap, a clearance passage is defined between the enlarged portion and the fan boss, the clearance passage has a first space side opening that opens in the first space and a second space side opening that opens in the second space, the first space side opening and the second space side opening communicate with each other through the clearance passage, the enlarged portion is biased in the suction space to the second space such that a pressure at the second space side opening is less than a pressure at the first space side opening, a part of the fan boss located in the first space is a first fan boss portion, a part of the fan boss located in the second space is a second fan boss portion, the enlarged portion covers the first fan boss portion and the second fan boss portion, and an area of the enlarged portion covering the second fan boss portion is larger than an area of the enlarged portion covering the first fan boss portion.

3. The blower according to claim 2, wherein a part of the enlarged portion covering the second fan boss portion has a length from the fan central axis to an outer edge portion facing leading edges of the plurality of blades, the length being longer than that of a part of the enlarged portion covering the first fan boss portion.

4. A blower configured to blow a first fluid and a second fluid, the blower comprising:

a centrifugal fan configured to rotate about a fan central axis so as to draw the first fluid and the second fluid from one side of the fan central axis and blow the first fluid and the second fluid outward in a direction away from the fan central axis; and a partition wall that is disposed in a suction space defined on an air suction side of the centrifugal fan, the partition wall being spaced from the centrifugal fan, wherein the centrifugal fan includes a plurality of blades arranged around the suction space and spaced from each other, the plurality of blades being configured to draw an air from the one side of the fan central axis by rotating about the fan central axis, and a fan boss that connects an end of each blade of the plurality of blades on another side of the fan central axis with each other, the partition wall has a base portion that extends along the fan central axis in the suction space so as to partition the suction space at least into a first space through which the first fluid flows and a second space through which the second fluid flows, and an enlarged portion connected to an end of the base portion on the other side of the fan central axis, the enlarged portion extending in a direction from the fan central axis toward the plurality of blades so as to cover a part of the fan boss, the base portion extends in the direction away from the tan central axis such that both ends farthest from the fan central axis in the base portion face the plurality of blades with a gap, a clearance passage is defined between the enlarged portion and the fan boss, the clearance passage has a first space side opening that opens in the first space and a second space side opening that opens in the second space, the first space side opening and the second space side opening communicate with each other through the clearance passage, the enlarged portion is biased in the suction space to the second space such that a pressure at the second space side opening is less than a pressure at the first space side opening, a part of the fan boss located in the first space is a first fan boss portion, a part of the fan boss located in the second space is a second fan boss portion, and the enlarged portion covers only the second fan boss portion in the first fan boss portion and the second fan boss portion.

5. A vehicular air-conditioning device configured to perform an inside-outside air mode in which an outside air is introduced from an outside of a passenger compartment and an inside air introduced from the passenger compartment circulates in the passenger compartment, the vehicular air-conditioning device comprising:

the blower according to claim 1, wherein the first fluid is the outside air, and the second fluid is the inside air.

* * * * *